United States Patent [19]
Wilkinson

[11] 4,289,226
[45] Sep. 15, 1981

[54] ELECTRIC VEHICLE BATTERY RECHARGING STATION

[76] Inventor: Rudolph P. Wilkinson, 320 Lincoln Center, Ardmore, Okla. 73401

[21] Appl. No.: 99,244

[22] Filed: Dec. 3, 1979

[51] Int. Cl.³ ............................................. G07F 15/12
[52] U.S. Cl. ................................ 194/84; 194/DIG. 3; 194/DIG. 18
[58] Field of Search ............. 194/9 T, 11, 84, DIG. 3, 194/DIG. 18, 1 L, 1 M

[56] References Cited

U.S. PATENT DOCUMENTS

| | | | |
|---|---|---|---|
| 796,062 | 8/1905 | Duncan | 194/11 |
| 844,436 | 2/1907 | Wood | 194/11 |
| 1,743,777 | 1/1930 | Hornby et al. | 194/11 |
| 2,505,389 | 4/1950 | Edwards | 194/84 |
| 4,052,655 | 10/1977 | Vizza | 194/11 X |

FOREIGN PATENT DOCUMENTS 153156  9/1953  Australia ............................. 194/84

Primary Examiner—F. J. Bartuska
Attorney, Agent, or Firm—Robert K. Rhea

[57] ABSTRACT

A parking meter-type apparatus for recharging the batteries of an electric vehicle when parked. The apparatus includes an electric outlet socket, connected with a municipal source of electrical energy, connectable with a vehicle mounted battery charger. The apparatus is manually actuated after inserting a coin for dispensing a predetermined quantity of electrical energy.

4 Claims, 3 Drawing Figures

ELECTRIC VEHICLE BATTERY RECHARGING STATION

BACKGROUND OF THE INVENTION

1. Field of the Invention

The present invention relates to recharging batteries of an electrical vehicle while parked at a predetermined parking station.

One disadvantage of using electrical vehicles is their limited range and the absence of convenient battery recharging stations. When convenient battery recharging stations are made available, the effective range of electric vehicles can be greatly increased. Assuming, for example, a workman, having an electric vehicle with a fifty mile range, lives some thirty-five miles from his workplace but to use his vehicle for transportation the batteries must be recharged. It is well known that proper recharging of storage batteries requires a considerable lapse of time, if, however, the vehicle could be recharged during the eight hours the workman is working then the electric vehicle will be a practical means of transportation. In order to provide such recharge stations an electric current vending apparatus is needed to dispense electrical energy as a function of power rather than a function of time. Such a system should provide the vehicle owner the option of purchasing electrical power in predetermined increments and be conveniently located and easily operated.

2. Description of the Prior Art

Prior patents generally relate to onboard battery vehicle charging apparatus, however, U.S. Pat. No. 4,052,655 discloses a meter stand located adjacent a conventional filling station for recharging vehicle batteries. This patent features an electric outlet for connection with an onboard vehicle charging system in which the vehicle connector cord is locked to the electric outlet to insure payment for current used before the owner can disconnect the connector cord.

This invention is distinctive over this patent in that it provides a coin operated current dispensing meter in which the purchaser selects and prepays for the current to be used as a function of power and time in accordance with the estimated current needed to recharge the batteries of his vehicle.

SUMMARY OF THE INVENTION

An electric current vending apparatus is mounted on or adjacent a conventional parking meter stand. The apparatus is preferably connected with underground supply mains communicating with the municipal source of electrical energy and is provided with an outlet socket for receiving a vehicle connected conductor. The vending apparatus includes a housing having coin or token receiving slots wherein the inserted coin is nested by a pair of slots formed in coin receiving levers normally spring urged into coin receiving position. One of the coin levers is connected with a manually operated control arm which, when rotated through a predetermined arc, rotates both levers and closes a normally open switch interposed in the electrical circuit which actuates a time controlled wattmeter. The coin falls by gravity into a coin receptacle and the coin levers are returned to coin receiving position for receiving additional coins and increasing the current supply time. The wattmeter rotates the normally open switch contact arm toward its open position as a function of time and electric potential which opens the switch after a predetermined interval.

The principal object of this invention is to provide a coin and manually actuated battery recharging station for dispensing electric energy in predetermined increments at a predetermined cost to the user.

DESCRIPTION OF THE PREFERRED EMBODIMENT

Figure 1:
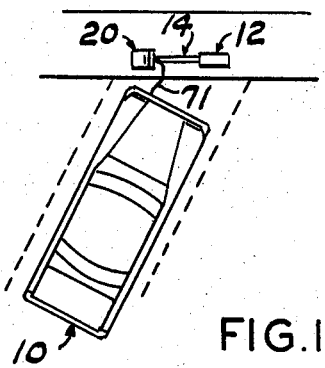
FIG. 1 is a plan view of a vehicle parked at a meter equipped parking area and connected with the elecric power vending meter.
Figure 2:
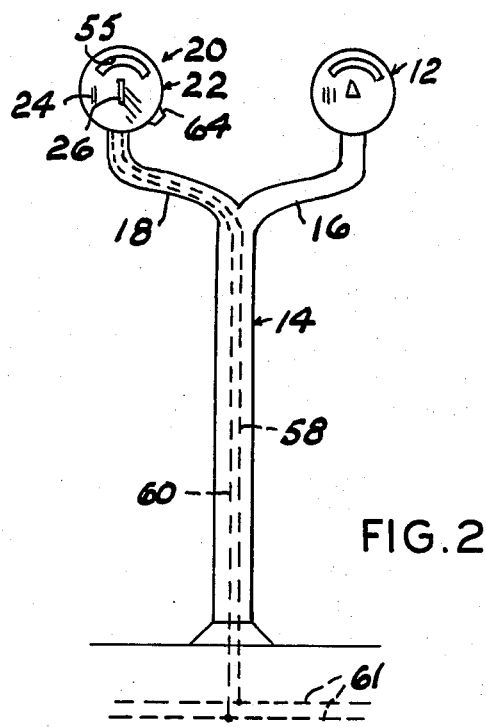
FIG. 2 is an elevational view of the combination parking meter and current vending meter illustrating, by dotted lines, electric conductors supplying current to the vending meter; and, FIG. 3 is a diagrammatic perspective view, with parts broken away for clarity, of the components housed by the current vending meter.

Like characters of reference designate like parts in those figures of the drawings in which they occur.

In the drawings:

The reference numeral 10 indicates an electric powered vehicle, such as an automobile, parked in front of a parking meter 12 supported by a stand 14 adjacent the curb near the vehicle. In the example shown, the upper end portion of the stand 14 is bifurcated so that one branch 16 of the stand supports the parking meter 12 and the other branch 18 supports the current meter or vending apparatus 20. The apparatus 20 includes a closed housing 22 of predetermined configuration formed in accordance with the physical requirements of the components, presently described, contained thereby.

The housing 22 contains a conventional coin receiving slot 24 and a slug ejecting apparatus, not shown, to insure payment for the current to be consumed before the apparatus can be activated.

Figure 3:
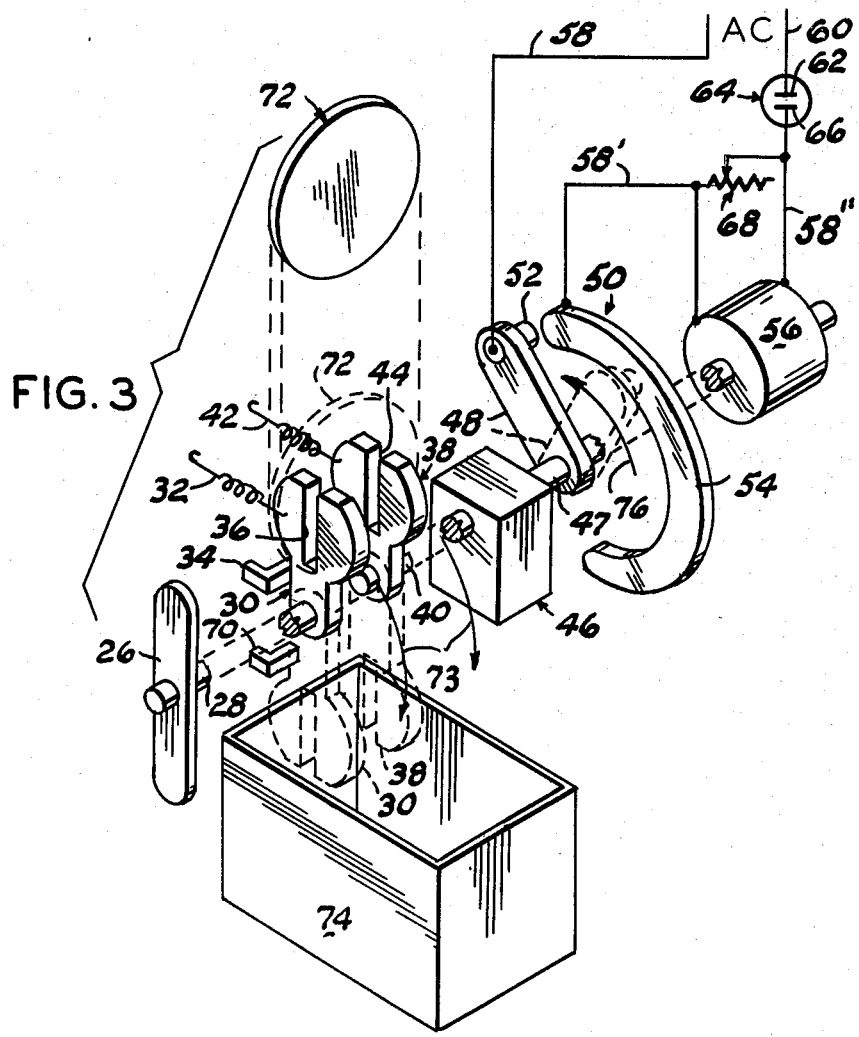

Referring more particularly to FIG. 3, a control arm 26 is connected with a first rod 28, projecting into the housing 22 and connected with one end portion of a first coin lever 30 normally disposed in an upright position by a spring 32 biasing the lever 30 against a stop 34. The upwardly disposed end portion of the lever 30 is provided with a transverse coin receiving slot 36. A second identical coin receiving lever 38 is similarly mounted on one end of a second rod 40, coaxially aligned with the first rod 28, adjacent and parallel with respect to the first lever 30. The second lever 38 is normally biased by a spring 42 toward the stop 34 and in upright position. The second lever 38 is similarly provided with a coin receiving slot 44 in cooperative alignment with the first lever coin slot 36.

The other end of the second rod 40 is connected with a gear train 46 in turn connected with a driven shaft 47 on which is mounted the armature 48 of a normally open switch 50. The gear train connected ends of the rod 40 and shaft 47 are provided with ratchets, not shown, which includes a pawl and cooperating ratchet teeth permitting the rods to be manually rotated in a clockwise apparatus activating direction, as viewed in the drawings, and rotated in a counterclockwise direction by the spring 42 and the presently described time operated wattmeter 56. The armature 48, formed of nonconductive material, is secured at one end portion to the shaft 47 and is provided with a contact 52 at its end opposite its connection with the shaft which is slidable in conductive relation along the switch other arcuate stationary contact 54 extending through an arc of substantially 180°.

The housing 22 is provided with a window 55 visually indicating the position of the switch arm 48 on the stationary contact 54. The other end portion of the shaft 47 is connected with a wattmeter 56 which, when activated, by closing the switch 50, dispenses current as presently described.

Leads 58 and 60 are connected with supply means 61 in turn connected with a source of electrical energy, not shown. The lead 60 is connected with one terminal 62 of a conventional outlet socket 64 preferably mounted on the housing 22. The lead 58 is connected with the switch contact 52 and an extension of this lead 58' connects the arcuate contact 54 to one contact of the wattmeter 56. A third extension of the lead 58, indicated at 58'', connects the other contact of the wattmeter with the other outlet terminal 66. A potentiometer-type resistor 68 is interposed between the leads 58' and 58'' to control the current value in accordance with the rate being charged for electrical energy supplied to the outlet socket 64.

OPERATION

In operation, the vehicle 10 is parked adjacent the vending apparatus and a connector cable 71, attached to the onboard vehicle battery charger, is plugged into the outlet 64. An accepted token or coin 72, of predetermined value, after being inserted into the housing slot 24, falls by gravity into the aligned coin receiving lever slots 36 and 44. The operator then manually rotates the control handle 26 in a clockwise direction, indicated by the arrows 73, through an arc of substantially 180°, limited by a housing mounted stop 70, wherein the coin forms a driving connection between the two levers thus rotating the second rod 40 and gears within the gear train 48. The gear train in turn rotates the shaft 47 to move the switch arm 48 and its contact 52 into switch closed sliding contact with the arcuate switch contact 54. The 180° movement of the control handle 26 thus moves the switch arm 48 through a selected arc of less than 180°, such as indicated by its dotted line position (FIG. 3). During this action the coin 72 falls by gravity into a coin receptacle 74 and the springs 32 and 42 return the coin levers to an upright position so that the operator may insert additional coins and repeat the above action to further advance the switch armature 48 along the contact 54 for additional periods of time and power to be dispensed. As stated above, closing the switch 50 activates the wattmeter 56 and energizes the electrical socket 64. The time drive of the wattmeter then progressively rotates the shaft 47 in a counter-clockwise direction, as indicated by the arrow 76, until the switch armature 48, moving in the same direction, subsequently opens the switch 50 thus interrupting current to the electrical socket 64.

Obviously the invention is susceptible to changes or alterations without defeating its practicability. Therefore, I do not wish to be confined to the preferred embodiment shown in the drawings and described herein.

I claim:

1. An electric energy vending apparatus, comprising:
    a closed housing having a coin slot for receiving coins or tokens;
    normally open circuit means including a switch having a movable contact slidably contacting an arcuate stationary contact contained by said housing and including leads connected with a source of electrical energy;
    an electrical outlet having terminals interposed in said circuit means;
    coin receiving means including first and second coin or token nesting levers manually rotatable in one direction through a first predetermined arc for closing said circuit means,
        said coin receiving means including first and second rods coaxially journalled horizontally by said housing and respectively connected at one end with one end portion of said first and second levers, respectively,
        a gear train connected with the other end of said second rod,
        a driven shaft connecting said gear train with said movable switch contact for movement of the latter through a second predetermined arc as a function of the angular rotation of said levers, and,
        spring means normally biasing said first and second levers toward a coin or token receiving position; and,
    wattmeter means interposed in said circuit and drivably connected with said driven shaft for biasing said switch open after a predetermined time interval.

2. The vending apparatus according to claim 1 in which the end portion of said first and second levers opposite said pair of rods are transversely slotted in aligned relation for cooperatively receiving an edge portion of a coin or token and forming a driving connection between said first and second levers.

3. The vending apparatus according to claim 2 and further including:
    resistor means interposed in said circuit means in parallel with said wattmeter means for regulating the electrical potential applied to said outlet terminals.

4. The vending apparatus according to claim 3 and further including:
    a stand supporting said housing above the surface of the earth; and, control handle means for rotating said coin levers in said one direction.

* * * * *